United States Patent [19]

Siebels

[11] 4,335,998
[45] Jun. 22, 1982

[54] CERAMIC-METAL ASSEMBLY

[75] Inventor: Johann Siebels, Wolfsburg, Fed. Rep. of Germany

[73] Assignee: Volkswagenwerk Aktiengesellschaft, Wolfsburg, Fed. Rep. of Germany

[21] Appl. No.: 40,121

[22] Filed: May 18, 1979

[30] Foreign Application Priority Data

May 24, 1978 [DE] Fed. Rep. of Germany ....... 2822627

[51] Int. Cl.³ .............................. F01D 5/30
[52] U.S. Cl. ........................ 416/213 R; 416/241 B
[58] Field of Search ........... 416/241 B, 214 A, 213 R

[56] References Cited

U.S. PATENT DOCUMENTS

| | | | |
|---|---|---|---|
| 2,874,932 | 2/1959 | Sörensen | 416/241 B X |
| 3,317,988 | 5/1967 | Endres | 416/219 R |
| 3,666,302 | 5/1972 | Kellett | 416/213 X |
| 3,784,320 | 1/1974 | Rossmann et al. | 416/241 B X |
| 3,891,351 | 6/1975 | Norbut | 416/219 R |
| 3,910,719 | 10/1975 | Hessler et al. | 416/219 R X |
| 3,943,703 | 3/1976 | Kronogard | 416/241 B X |
| 4,051,585 | 10/1977 | Walker et al. | 416/241 B X |
| 4,125,344 | 11/1978 | Tiefenbacher | 416/241 B X |
| 4,169,694 | 10/1979 | Sanday | 416/241 B X |
| 4,176,519 | 12/1979 | Kronogard | 416/241 B X |

FOREIGN PATENT DOCUMENTS

| | | | |
|---|---|---|---|
| 2250563 | 5/1973 | Fed. Rep. of Germany | 416/241 B |
| 892785 | 5/1944 | France | 416/241 B |
| 836030 | 6/1960 | United Kingdom | 416/241 B |
| 121219 | 1/1959 | U.S.S.R. | 416/241 B |

*Primary Examiner*—Everette A. Powell, Jr.
*Attorney, Agent, or Firm*—Brumbaugh, Graves, Donohue & Raymond

[57] ABSTRACT

A connection between non-oxidic ceramic (ceranox) material and metallic material is formed by providing a recess in the metallic material having oppositely facing internal surfaces between which is positioned a portion of a ceramic component with intervening gaps. The gaps are filled with a high temperature solder. The solder is preferably melted into position between the metallic and ceramic components in an evacuated soldering oven according to a stepped temperature profile.

7 Claims, 5 Drawing Figures

CERAMIC-METAL ASSEMBLY

BACKGROUND OF THE INVENTION

This invention relates to connections between a metallic component of an assembly and a non-oxidic ceramic (ceranox) component of an assembly capable of withstanding high thermal and mechanical stresses. The present invention also relates to methods for producing such connections.

In certain applications it is desirable to replace conventional metallic components with ceramic materials. This is particularly true in gas turbine engines where the use of ceramic materials for certain components, such as turbine blades or turbine rotors, enables an increase in the efficiency and performance of the engine by an increase in the operating temperature which can be maintained in the vicinity of the turbine blades and turbine rotors as compared to gas turbine engines having such components made from conventional metallic materials, which exhibit limited operating temperature ranges, owing to the relatively low thermal resistance of metal. Ceramic materials preferably considered for turbine rotors and blades include Ceranox ceramics, that is non-oxidic ceramic materials, such as silicon carbide and silicon nitride.

The use of such ceramic materials is often inhibited by difficulties which are encountered in forming a connection between components made with non-oxidic ceramic materials and components which are made from conventional metallic materials, for example when attaching a ceramic turbine rotor to a metallic turbine shaft, or mounting ceramic turbine blades in a metallic turbine rotor. Such difficulties arise in part because of the relatively high brittleness of the ceramic materials, which exhibit practically no plastic deformation or flow when subjected to stress. Hence, unlike metallic materials, such ceramic materials are incapable of reducing the local stress peaks occurring in the course of operation. Stress peaks may be caused by unavoidable manufacturing tolerances or by the uneven thermal expansion of the metallic and ceramic components. For this reason no edge or even point contact is permissible between ceramic and metallic components, so that the components to be connected by prior art techniques required expensive precision manufacturing and processing methods, with a high surface quality and accuracy.

It is therefore an object of the present invention to provide an assembly having a new and more reliable connection between components consisting of ceranox and components made from metallic material.

It is a further object of the present invention to provide such an assembly which can endure high thermal and mechanical loads.

It is a further object of the invention to provide an improved turbine assembly having ceramic turbine blades mounted to a metallic turbine rotor.

It is a further object of the invention to provide an improved turbine assembly comprising a ceramic turbine rotor mounted on a metallic turbine shaft.

SUMMARY OF THE INVENTION

In accordance with the present invention there is provided an assembly having a metallic component and a non-oxidic ceramic component and having a connection between the components capable of withstanding high thermal and mechanical stresses. The connection includes a recess in the metallic component having at least two opposite inwardly facing surfaces. A portion of the ceramic component having corresponding outwardly facing surfaces is fitted into the recess with gaps between the inwardly facing and outwardly facing surfaces. A high-temperature solder is provided to fill the gaps.

In accordance with the preferred embodiment of the invention the solder comprises a high-temperature solder selected from the Nicrobraz alloy group. The solder may include boron and/or manganese and may also include a cobalt based alloy. Where the ceramic component has portions projecting outside of the recess, it is desirable to provide a reduced cross sectional thickness of the metallic component in the region of the projection.

In accordance with the invention the assembly may comprise a metallic turbine rotor joined to ceramic turbine blades. The recesses in this case comprise substantially circular undercut grooves spaced around the periphery of the rotor. The ceramic component comprises ceramic turbine blades having a base portion fitted into the recesses on the metallic rotor. The base portions of the blades have an approximately elliptical axial cross section with the major elliptical axis extending in the longitudinal direction of the blade and the radial direction of the rotor.

In another embodiment of the invention, the ceramic component comprises a ceramic turbine rotor having a central bore and the metallic component includes a first collar mounted on a hollow turbine shaft, and a second collar mounted on a pin which passes through the bore and is soldered into the shaft so that the space between the first and second columns forms the recess for receiving the ceramic turbine rotor.

In accordance with another aspect of the invention, there is provided a method for joining metallic and ceramic components in an assembly in accordance with the invention. The method includes heating the components and solder in an evacuated soldering oven. Heating takes place by a series of step-like temperature increases. The oven is maintained at each of a number of below-soldering temperatures for a prolonged period to stabilize the temperature of the ceramic component. Following soldering the oven is continuously cooled.

In accordance with the invention, the problem of uniting ceramic and metallic components is solved by a structure in which the ceramic component is surrounded by the metallic component on at least two opposite sides with the formation of intervening gaps which are filled by a high temperature solder. By providing a soldered gap, which according to the invention at least partially surrounds the ceramic component, a shrink fit is produced after cooling between the ceramic component and the metallic component because of the different coefficient of expansion of the ceramic and metallic components. This shrink fit facilitates a reliable and firm connection between the components. During soldering, the liquid solder equalizes any manufacturing tolerances and surface defects which may be present on the surface of the ceramic components or the metallic component so that expensive processing operations to smooth out these surfaces can be dispensed with.

Because of the shrink fit, the ceramic component is subjected to compressive stresses, which can be easily tolerated by the ceramic material. These stresses are sufficiently high that even when the assembly is increased to operating temperature the ceramic material is under compression. A particular advantage of the invention is that the connection between the ceramic component and the metallic component does not produce any tensile stresses in the ceramic component which might combine with operating stresses and tend to fracture the component. The use of the solder joints provides new possibilities for structural design of the components which can result in further improvement of the stress conditions in the components during operation of the assembly.

When high temperature solders selected from the Nicrobraz alloy group are used, particularly those containing boron or manganese, there is, in addition to the shrink fit between the ceramic and metallic components, a chemical-mechanical connection resulting from a reaction between the solder and the silicon nitride or silicon carbide ceramic. A cobalt base alloy, such as Triballoy, can be provided in order to make the solders ductile. Triballoy comprises 55% cobalt, 35% molybdenum, and 10% silicon.

By reducing the cross-sectional area of the metallic component in the region where the ceramic component projects from the recess in the metallic component, there is a reduction in tensile stresses induced in the ceramic component. The weakening of the metallic component leads to a reduction in compressive stresses induced by the shrink fit because of an increased yielding possibility in the metallic component.

In mounting a ceramic turbine blade to a metallic rotor, there are provided undercut axial grooves having a circular cross section around the periphery of the rotor. The base of each ceramic turbine blade is formed to have an axial cross section in the form of a slender elipse, with its major axis extending in the longitudinal direction of the blade, which is the radial direction of the rotor. This arrangement provides for a firm and reliable mounting of the turbine blade in the metallic rotor with a minimum amount of stress exerted on the ceramic component.

In another embodiment of the invention, a ceramic turbine rotor having a central bore is mounted to a metallic shaft. In a preferred arrangement, the ceramic turbine rotor is mounted between collars attached to the turbine shaft. The solder is used not only between the collars and the turbine rotor, but also between individual parts of the shaft to which the collars are attached. Upon cooling, the turbine rotor is mounted by shrink fit between the two collars. This fit is further assisted during cooling by the shrinkage of the shaft connection between the two collars.

The method according to the invention of heating the ceramic and metallic components in a soldering oven using stepwise temperature increases, provides for uniform heating of the ceramic component of the assembly so that upon soldering there is no premature solidification of the solder on contact with the ceramic components.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
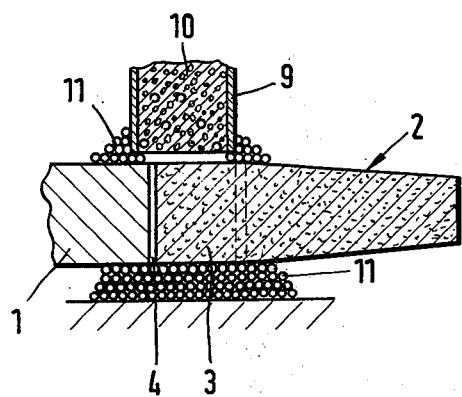
FIG. 1 is a partial radial cross-section of an assembly in accordance with the present invention comprising a ceramic turbine blade mounted in a metallic turbine rotor.
Figure 2:
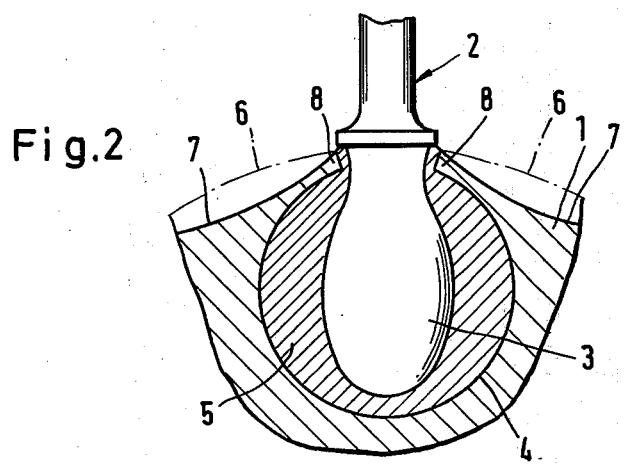
FIG. 2 is a partial axial cross-section of the FIG. 1 assembly.

Referring to FIGS. 1 and 2 there is shown respectively a partial radial and a partial axial cross-section of an assembly including a metallic turbine rotor 1 to which is mounted a ceramic turbine blade 2 in accordance with the present invention. While only a single turbine blade 2 is illustrated in FIGS. 1 and 2, it should be understood that the cross sectional views are exemplary, and many such turbine blades 2 are mounted on turbine wheel 1. Each of the ceramic turbine blades 2 is made out of non-oxidic ceramic material (Ceranox), such a silicon carbide or silicon nitride. Each of the blades 2 has a blade base portion 3 which is mounted within an axially extending circular cross-section groove 4 in metallic turbine wheel 1. While base portion 3 of blade 2 is within the recess formed by groove 4, the remaining portions of blade 2 project outwardly beyond the recess in turbine wheel 1 formed by groove 4.

Since groove 4 has an approximately circular cross-sectional shape, and the base portion 3 of blade 2, which is mounted within the recess formed by groove 4, has a substantially eliptical cross-section, there is provided a gap 5 between the inwardly facing opposite surfaces of groove 4 and the outwardly facing opposite surfaces of the blade base portion 3. This gap 5 is filled with a high temperature solder to form the assembly in accordance with the invention. The soldering is carried out in an evacuated oven using a temperature program which is different from the program applied during the soldering of metals, because the ceramic components, with lower thermal conductivity, require longer than the usual heating time to reach a uniform temperature.

Figure 5:
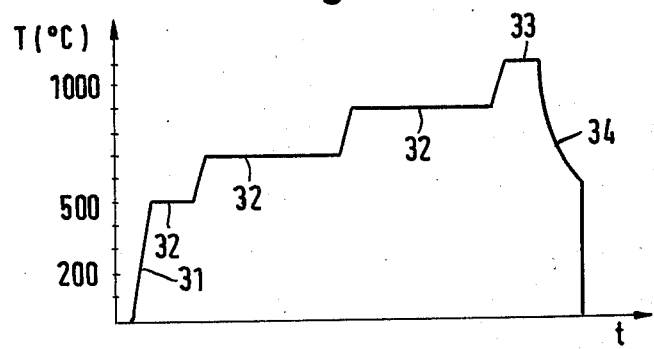
FIG. 5 is a graph showing the temperature profile for a method of soldering an assembly of a ceramic and a metallic component in accordance with the present invention.

Referring to FIG. 5 there is shown a temperature curve 31 corresponding to the temperature changes of a soldering oven with time, for soldering according to the method of the present invention. The oven is maintained at each of several temperature levels 32 for a relatively long period of time, for example, approximately one-half hour to one hour. Following the final soldering phase 33 at the soldering temperature, which has a duration of approximately one-quarter hour, the assembly is continuously cooled according to the curved section 34.

Solders which are suitable for this operation are the commercially available high-temperature solders listed in Table I. Particularly favorable are solders type 50, 65, 130, 220 and 230. The solders containing manganese and/or boron, in particular, lead to an additional chemical-mechanical connection as a result of a reaction with the silicon nitride or silicon carbide of the ceranox material. For mixing the solders with a view toward making them ductile, above all in the case of type 65, 130 and 230 solders, a cobalt base alloy in a form known as Triballoy T100 comprising 65% cobalt, 35% molybdenum and 10% silicon can be used.

In some reaction sintered silicon nitride types, the use of solders alloyed with manganese and boron produces violent reactions which lead to the foaming of the solder. This can be largely prevented by applying a thin layer of aluminum oxide to the ceramic material in the area of soldering. As indicated in FIG. 1 such aluminum oxide powder, α-type $Al_2O_3$ denoted by numeral 11, can also be used for reducing solder flow away from the soldering site. In the FIG. 1 embodiment, in order to make sufficient soldering material available, a small tube 9, which may be made from ceramic or other high-temperature resistant metallic material, has been provided above the soldering site for accommodation of powdered solder 10.

As may be seen in the axial cross-sectional view of FIG. 2, the cross-sectional area of the metallic rotor component has been reduced in the region 8, adjacent the point where the ceramic turbine blade projects from the recess filled with solder. The cross-section is reduced by providing concave recesses 7 at the radially outer surface of the turbine rotor between individual blades. The original circular cross section of the metallic rotor 1 is indicated in a dotted profile 6. As a result of reduction of the metallic cross-section 8, the compressive stresses caused by shrink fit are reduced in the region where the ceramic blade 2 projects from the metallic rotor 1. This reduction in compressive stress is because of the easier plastic deformation of the metallic rotor at region 8. This reduction of the compressive stress in the transitional region leads to a minimization of the tensile stress induced by such compressive stresses, and results in favorable stress conditions in the ceramic material enhancing a high stability of the assembly.

Figure 3:
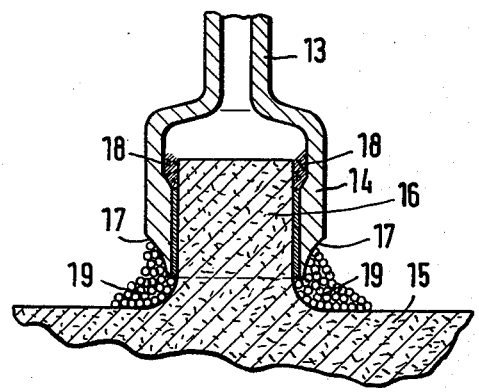
FIG. 3 is a central radial cross-section of an assembly in accordance with the present invention comprising a ceramic turbine rotor mounted to a metallic turbine shaft.

FIG. 3 is a central radial cross-section of an assembly in accordance with the invention wherein a ceramic turbine rotor 15 is mounted to a metallic shaft 13. In the FIG. 3 embodiment, a tubular expanded portion 14 of shaft 13 concentrically grips a tenon 16 arranged on the ceramic turbine rotor 15. The annular gap remaining between the tubular shaft portion 14 and the turbine rotor tenon 16 is filled with high temperature solder for which a reservoir 18 is formed on the inside of the expanded shaft portion 14. Reservoir 18 is formed by undercutting an enlargement of the inner diameter of the shaft. Toward the end of the shaft tube 14, there is provided an external recess 17 in the tube to provide a continuous reduction of the outside diameter toward the end. The function of recess 17 is to minimize the tensile stress induced in the ceramic material in the region where it projects from the recess within the tube 14. Alpha-aluminum oxide powder 19 is provided to prevent solder flow away from the gap between tenon portion 16 of ceramic turbine rotor 15 and the surrounding recess within tube 14.

Figure 4:
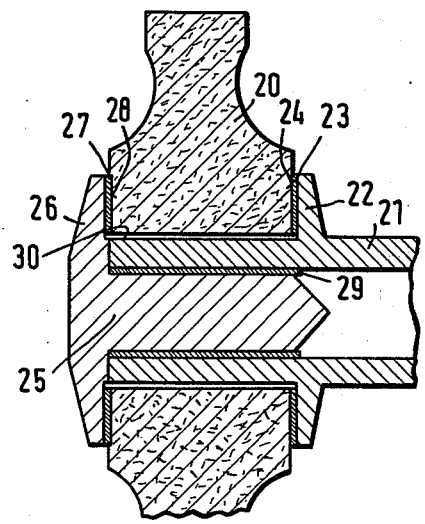
FIG. 4 is a central radial cross-section of another assembly in accordance with the present invention comprising a ceramic turbine rotor with a central bore mounted to a metallic turbine shaft.

FIG. 4 is another embodiment of an assembly between a ceramic turbine rotor 20 and a metallic turbine shaft 21. In the FIG. 4 embodiment the turbine rotor 20 has a central bore 30 through which the turbine shaft 21 is passed. The turbine rotor is attached to shaft 21 by the use of collars 22 and 26, which are adjacent to the faces 24 and 28 of the turbine rotor 20. There are provided intervening gaps 23 and 27 between the ceramic rotor and collars 22 and 26, which are filled with high-temperature solder. Shaft collar 22 is formed directly on the hollow turbine shaft 21. Shaft collar 26 forms a part of a shaft end pin 25 which is introduced into the bore of shaft 21 at the open end of the shaft and fastened within the inside of shaft 21 by solder 29. As a result of the soldering of shaft pin 25 onto hollow shaft 21, an operation carried out in a stress free manner at high temperatures, there is produced, after cooling, a compressive stress exerted by the shaft collars 22 and 26 on the turbine rotor, owing to the difference between the coefficient of expansion of the metallic shaft parts and the ceramic turbine rotor, which compressive stress, together with the soldering on the face of the turbine rotor brings about a firm shrink fit of the ceramic turbine rotor 20 against the metallic shaft 21. This shrink fit may be assisted by a mechanical-chemical connection by the appropriate choice of solders, if required.

While there has been described what are believed to be the preferred embodiments of the invention, those skilled in the art will recognize that other and further modifications may be made thereto without departing from the true spirit of the invention, and it is intended to claim all such embodiments as fall within the true scope of the invention.

| Type | Cr | B | Si | Fe | C | Other | Melting point °C. Sol. | Melting point °C. Liq. | Soldering range °C. | Recommended °C. | Soldering atmosphere |
|---|---|---|---|---|---|---|---|---|---|---|---|
| 125 | 14 | 3,5 | 4,5 | 4,5 | 0,7 | — | 970 | 1040 | 1065–1200 | 1175 | A,B |
| 124 | 13 | 3 | 4,5 | 4 | 0,6 | — | 970 | 1040 | 1065–1200 | 1175 | A,B |
| L.M. | 6,5 | 3 | 4,5 | 2,5 | 0,06 | — | 970 | 1175 | 1010–1175 | 1040 | A,B. |
| 10 | — | — | — | — | 0,10 | P 11 | 875 | 875 | 925–1010 | 980 | A,B,C,D |
| 30 | 19 | — | 10 | — | 0,1 | — | 1080 | 1135 | 1150–1200 | 1190 | A,B,C |
| 50 | 13 | — | — | — | 0,1 | P 10 | 890 | 890 | 925–1065 | 980 | A,B,C |
| 65 | — | — | 7 | — | — | Mn 23 Cu 5 | 1010 | 1010 | 1010–1090 | 1065 | A,B,C |
| 130 | — | 3 | 4,5 | — | 0,06 | — | 980 | 1040 | 1010–1175 | 1040 | A,B |
| 135 | — | 1,8 | 3,5 | — | 0,06 | — | 990 | 1060 | 1065–1175 | 1120 | A,B |
| 150 | 15 | 3,5 | — | — | 0,1 | — | 1055 | 1055 | 1065–1200 | 1175 | A,B |
| 160 | 10 | 2 | 2,5 | 2,5 | 0,45 | — | 970 | 1160 | 1150– | 1190 | A,B |

-continued

| Type | Guide analysis | | | | | Melting point °C. | | Soldering range °C. | Recommended °C. | Soldering atmosphere |
|---|---|---|---|---|---|---|---|---|---|---|
| | Cr | B | Si | Fe | C | Other | Sol. | Liq. | | | |
| 170 | 11,5 | 2,5 | 3,25 | 3,75 | 0,55 | W 16 | 970 | 1160 | 1150–1200 | 1175 | A,B |
| 171 | 10 | 2,5 | 3,5 | 3,5 | 0,4 | W 12 | 970 | 1095 | 1150–1200 | 1150 | A,B |
| 180 | 5 | 1 | 3 | 3,5 | 0,25 | — | 970 | 1180 | 1175–1230 | 1200 | A,B |
| 200 | 7 | 3,2 | 4,5 | 3 | 0,1 | W 6 | 975 | 1040 | 1065–1175 | 1120 | A,B |
| 220 | 4 | 0,9 | — | — | 0,1 | Mn 45 | 995 | 1080 | 1095–1175 | 1095 | A,B |
| 230 | 3,5 | 0,9 | 2,5 | 1,0 | 0,1 | Mn 35 | 980 | 1065 | 1065–1120 | 1065 | A,B |
| 300 | 25 | 3 | 2,75 | 2 | 0,75 | W 10 Ni 11 CoRest | 1040 | 1120 | 1175–1230 | 1200 | A,B |

A Dry hydrogen or inert gas
B Vacuum
C Dissociated ammonia (dew point — 50° C. or better)
D Exothermal atmosphere

I claim:

1. An assembly comprising a metallic component and a nonoxidic ceramic component supported by said metallic component;
said metallic component having an opening therein and a recess communicating with said opening, said recess being defined by at least two opposite inwardly facing surfaces;
said ceramic component having a base portion disposed in said recess and a second portion projecting out of said recess through said opening, wherein said base portion and said surfaces define a gap therebetween for spacing said base portion from said metallic component;
said assembly further comprising a high temperature solder filling said gaps, said solder being applied in liquid form at elevated temperature, wherein said solder and said metallic component, due to the elevated application temperature and differences in thermal coefficients of expansion between said solder and metallic component and said ceramic component, are shrunk fit around said base portion for applying compressive stresses to said base portion, and wherein said metallic component has a reduced cross-sectional thickness normal to said surfaces in the region of said opening, said reduced thickness being effective to cause plastic deformation in said region of said metallic component, and to reduce the compressive stress, in said region, of said metallic component against said base portion, thereby reducing the tensile stresses on said ceramic component and producing a connection between said components capable of withstanding high thermal and mechanical stresses.

2. An assembly as specified in claim 1 wherein said solder comprises a high-temperature solder selected from The Nicrobraz alloy group.

3. An assembly as specified in claim 2 wherein said solder further includes a cobalt based alloy.

4. An assembly as specified in claim 2 wherein said solder includes a metal selected from the group consisting of boron and manganese.

5. An assembly as specified in claim 4 wherein said solder further includes a cobalt based alloy.

6. An assembly as specified in any of claims 1 through 5 wherein said metallic component comprises a metallic turbine rotor, wherein said recesses comprise substantially circular cross-section, undercut, axially extending grooves spaced around the periphery of said rotor, wherein said ceramic component comprises a ceramic turbine blade, and wherein said portion fitted into said recess comprises a blade base having an approximately eliptical axial cross section, with the major elliptical axis extending in the longitudinal direction of said blade and the radial direction of said rotor.

7. Apparatus as specified in any of claims 1, 2, 3, 4, or 5 wherein said ceramic component comprises a ceramic turbine rotor having a central bore, wherein said metallic component comprises a first collar, mounted on a hollow shaft, and a second collar mounted on a pin inserted into and soldered to said shaft and wherein said recess comprises the space between said collars.

* * * * *